(12) United States Patent
Alter et al.

(10) Patent No.: US 9,074,473 B2
(45) Date of Patent: Jul. 7, 2015

(54) HOLLOW REBAR FOR CROSSHOLE SONIC LOGGING ACCESS TUBES AND LONGITUDINAL CONCRETE REINFORCING IN DRILLED SHAFTS

(75) Inventors: Josef K. Alter, Descanso, CA (US); Horst K. Aschenbroich, Surrey (CA)

(73) Assignee: Con-Tech Systems Ltd., Delta, BC (CA)

( * ) Notice: Subject to any disclaimer, the term of this patent is extended or adjusted under 35 U.S.C. 154(b) by 752 days.

(21) Appl. No.: 13/405,623

(22) Filed: Feb. 27, 2012

(65) Prior Publication Data

US 2012/0314540 A1 Dec. 13, 2012

Related U.S. Application Data

(60) Provisional application No. 61/494,090, filed on Jun. 7, 2011.

(51) Int. Cl.
*G01V 1/00* (2006.01)
*E21D 5/06* (2006.01)

(52) U.S. Cl.
CPC .... *E21D 5/06* (2013.01); *G01V 1/00* (2013.01)

(58) Field of Classification Search
CPC ............. E21D 5/06; E21D 5/01; E21D 5/012; E21D 5/016
USPC ........... 367/86; 405/272; 73/152.54; 250/256
See application file for complete search history.

(56) References Cited

FOREIGN PATENT DOCUMENTS

| | | | |
|---|---|---|---|
| CN | 1755016 A | 4/2006 | |
| CN | 201232182 Y | 5/2009 | |
| CN | 101851936 A | 10/2010 | |
| KR | 20100052398 A | * 5/2010 | ............. F16B 13/02 |

OTHER PUBLICATIONS

"Reinforced solid," Wikipedia, 2014, downloaded Jan. 8, 2015 from http://en.wikipedia.org/wiki/Reinforced_solid, 4 pp.*
"CTS/TITAN Injection Bore System," Con-Tech Systems Ltd., 2006, 24 pp.*
Josef K. Alter, "Hollow Threaded Rebar for Cross Hole Sonic Logging Access Tubes Combined with Longitudinal Concrete Reinforcing in Drilled Shafts," Technical Note, DFI Journal, vol. 5, No. 2, Nov. 2011, pp. 16-22.
Branagan & Associates, "Using Crosshole Sonic Logging (CSL) to Test Drilled-Shaft Foundations," www.branagan.com, 2002, 5 pp.

(Continued)

*Primary Examiner* — Daniel L Murphy
(74) *Attorney, Agent, or Firm* — Muirhead and Saturnelli, LLC

(57) ABSTRACT

Hollow rebar may be used for structural reinforcement in a drilled shaft and to provide access tubes for a sonic integrity testing probe. Rebar (short for reinforcing bar) is steel bar used as a tensioning device in reinforced concrete that holds the concrete in compression. According to the system described herein, hollow rebar may provide high strength reinforcement in the drilled shaft while at the same time providing an access tube for a sonic integrity testing process, such as crosshole sonic logging (CSL). The high strength hollow rebar, having ridges, threads and/or other appropriate surface deformations, provides improved adhesion to concrete, thus eliminating the problem of debonding associated with non-structural access tubes made of smooth PVC or steel pipe.

18 Claims, 3 Drawing Sheets

(56) References Cited

OTHER PUBLICATIONS

Sharooz et al., "National Cooperative Highway Research Program (NCHRP) Report 679: Design of Concrete Structures Using High-Strength Steel Reinforcement," Transportation Research Board (TRB), Mar. 2011, 83 pp.

American Society for Testing and Materials, ASTM A615 / A615M—09b, Standard Specification for Deformed and Plain Carbon-Steel Bars for Concrete Reinforcement, published Jan 2009, Summary, 3 pp.

American Society for Testing and Materials, ASTM A706 / A706M—09b, Standard Specification for Low-Alloy Steel Deformed Bars for Concrete Reinforcement, published Jan. 2009, Summary, 3 pp.

American Society for Testing and Materials, ASTM D4428 / D4428M—07, Standard Test Methods for Crosshole Seismic Testing, published 2007, Summary, 3 pp.

American Society for Testing and Materials, ASTM D6760-08, Standard Test Method for Integrity Testing of Concrete Deep Foundations by Ultrasonic Crosshole Testing, published 2008, Summary, 3 pp.

M. W. O'Neil and L. C. Reese, "Drilled Shafts: Construction Procedures and Design Methods," Federal Highway Administration, FHWA Report No. FHWA-IF-99-025, 1999, pp. i-xxv, 1-12.

* cited by examiner

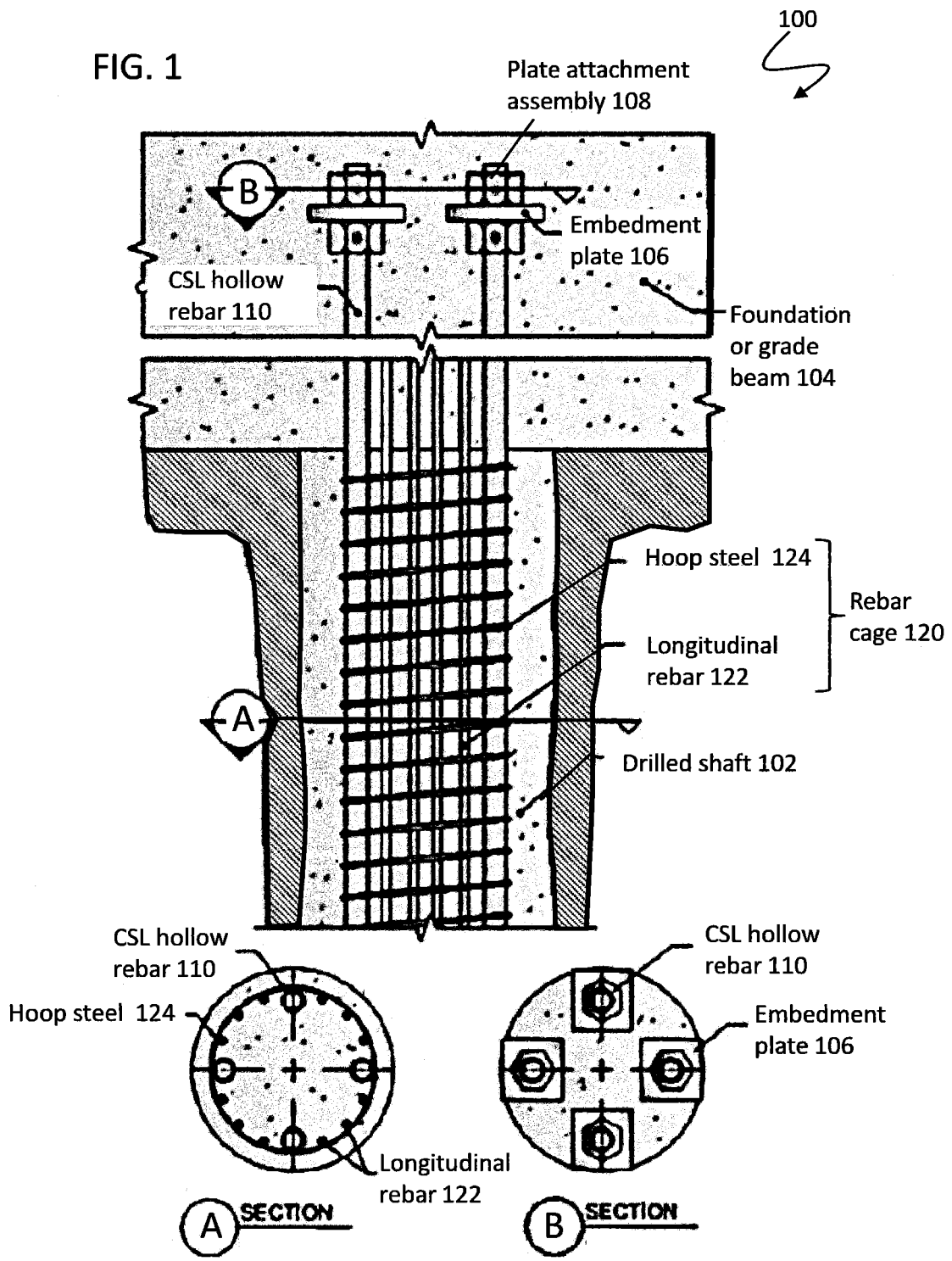

HOLLOW REBAR FOR CROSSHOLE SONIC LOGGING ACCESS TUBES AND LONGITUDINAL CONCRETE REINFORCING IN DRILLED SHAFTS

RELATED APPLICATIONS

This application claims priority to U.S. Prov. App. 61/494,090, filed Jun. 7, 2011, entitled "CTS-TITAN 73/56 Hollow Threaded Rebar for Cross Hole Sonic Logging Access Tubes and Longitudinal Concrete Reinforcing in Drilled Shafts," which is incorporated herein by reference.

TECHNICAL FIELD

This application is related to the field of reinforcing drilled shafts and verifying the integrity thereof.

BACKGROUND OF THE INVENTION

Crosshole Sonic Logging (CSL) is a method to verify the integrity of drilled shafts and other concrete piles and determine soundness of concrete within the drilled shaft inside of a rebar cage providing structural reinforcement of the drilled shaft. (See, for example, American Society for Testing and Materials, ASTM D6760-08, *Standard Test Method for Integrity Testing of Concrete Deep Foundations by Ultrasonic Crosshole Testing*, which is incorporated herein by reference.)

CSL involves use of steel or plastic tubes installed in the drilled shaft and tied to the rebar cage. After the shaft is drilled, and before the rebar cage is placed in the hole, plastic or steel tubes are attached to the interior of the rebar cage, and then the cage is lowered into the hole and the concrete is placed. The tubes are filled with water as an intermediate medium. After curing for 3-7 days, a sound source and receiver are lowered, maintaining a consistent elevation between source and sensor. A signal generator generates a sonic pulse from the emitter which is recorded by the sensor. Relative energy, waveform and differential time are recorded and logged. This procedure is repeated at regular intervals throughout the pile and then mapped. By comparing the graphs from the various combinations of access tubes, a qualitative idea of the soundness of the concrete throughout the pile can be gleaned.

CSL is required by most departments of transportation (DOTs) and transmission line owners for quality control of drilled shaft construction. Current practice is to add 1½" or 2" inner diameter (ID) tubes for instrumentation access throughout the length of the drilled shaft. There are typically 3 to 8 CSL access tubes per drilled shaft. Generally, one CSL access tube may be used per foot of diameter of the drilled shaft. Each drilled shaft tested using CSL requires access tubes. In known techniques, smooth PVC or steel pipe is used to create the sonic access tubes for the CSL logging instrument which travels the entire length of the drilled shaft. Reports of debonding of the PVC or smooth steel pipe are known to occur.

Accordingly, it would be desirable to provide access tubes for CSL and/or other integrity test that overcome the above-noted problems and provide further advantages in drilled shaft reinforcement and integrity testing.

SUMMARY OF THE INVENTION

According to the system described herein, a method of performing integrity testing of a drilled shaft includes inserting a probe for an integrity test into at least one hollow rebar of the drilled shaft that acts as at least one access tube for the integrity test. The hollow rebar further provides structural reinforcement of the drilled shaft. The hollow rebar may include threads or ridges that reduce debonding of the rebar from concrete of the drilled shaft. The hollow rebar may be TITAN 73/56 hollow threaded rebar. The integrity test may be crosshole sonic logging and/or gamma gamma logging. The hollow rebar may be a plurality of hollow rebars equally spaced around a circumference of a rebar cage of the drilled shaft. One access tube may be provided per foot of diameter of the rebar cage of the drilled shaft. All access tubes for the integrity test may be provided by the at least one hollow rebar and all of the access tubes may further provide structural reinforcement of the drilled shaft. For a total steel area of longitudinal reinforcing rebar provided by a rebar cage of the drilled shaft, a percentage of the total steel area provided by the at least one hollow rebar may be in a range of 30% to 60%.

According to the system described herein, a system for reinforcing a drilled shaft includes at least one hollow rebar that provides structural reinforcement of the drilled shaft. The hollow rebar further provides an access tube for an integrity test of the drilled shaft. The hollow rebar may include threads or ridges that reduce debonding of the rebar from concrete of the drilled shaft. The hollow rebar may be TITAN 73/56 hollow threaded rebar. The integrity test may be crosshole sonic logging and/or gamma gamma logging. The hollow rebar may include a plurality of hollow rebars equally spaced around a circumference of a rebar cage of the drilled shaft. One access tube may be provided per foot of diameter of the rebar cage of the drilled shaft. All access tubes for the integrity test may be provided by the at least one hollow rebar and all of the access tubes may further provide structural reinforcement of the drilled shaft. For a total steel area of longitudinal reinforcing rebar provided by a rebar cage of the drilled shaft, a percentage of the total steel area provided by the at least one hollow rebar may be in a range of 30% to 60%.

BRIEF DESCRIPTION OF THE DRAWINGS

Embodiments of the system described herein are explained with reference to the several figures of the drawings, which are briefly described as follows.

FIG. 1 is a schematic cross-sectional illustration showing use of hollow rebar in a drilled shaft to provide a CSL access tube according to an embodiment of the system described herein.

FIGS. 2A and 2B are schematic illustrations showing sectional views taken from sections A and B, respectively, of FIG. 1.

DETAILED DESCRIPTION OF VARIOUS EMBODIMENTS

Figure 3:
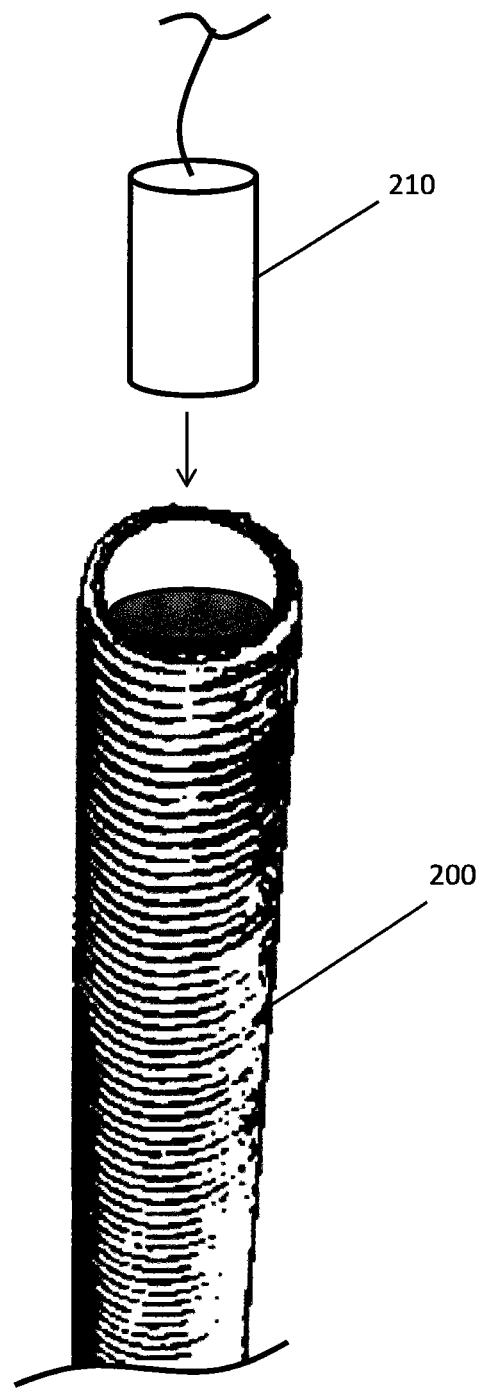
FIG. 3 is a schematic illustration showing insertion of a CSL probe into a hollow threaded rebar that is functioning as an access tube used in connection with CSL according to an embodiment of the system described herein.

In performing CSL of drilled shafts with current techniques, known sonic access tubes, such as 1½" or 2" ID tubes, installed inside the steel reinforcement cage do not contribute to the structural capacity of the drilled shaft. According to the system described herein, hollow rebar may be used for structural reinforcement in a drilled shaft and to provide access tubes for a CSL probe. Rebar (short for reinforcing bar) is steel bar used as a tensioning device in reinforced concrete that holds the concrete in compression. According to the system described herein, hollow rebar may provide high strength reinforcement in the drilled shaft while at the same time providing a sonic access tube. Further, it is noted that, in various embodiments, the high strength hollow rebar, having ridges, threads and/or other appropriate surface deformations, provides improved adhesion to concrete, thus eliminating the problem of debonding associated with non-structural access tubes made of smooth PVC or steel pipe.

The use of hollow rebar for shaft reinforcement and as an access tube may provide a value engineering alternative that may both reduce material and labor costs for drilled shaft construction and may provide an advantage where anchor bolt cages and longitudinal reinforcing may create undesirable congestion. Drilled shafts for transmission line construction may also benefit from the use of hollow rebar access tubes according to the system described herein, especially where tower anchor bolt cages conflict with the longitudinal reinforcing in the drilled shaft. It is noted that although CSL is principally discussed herein, the system described herein may also be used in connection with other appropriate ultrasonic inspection techniques involving use of access tubes, such as Gamma Gamma Logging (GGL). Accordingly, references to CSL herein may be understood to apply also to such other appropriate inspection techniques.

In an embodiment, the hollow rebar used in connection with the system described herein may be Ischebeck TITAN 73/56 (T73/56) hollow threaded rebar and may provide a 56 mm ID (2.2") sonic access tube. Table 1, below, shows CSL/Hollow Threaded Rebar properties.

particular ultrasonic inspection techniques that may be suitably performed according to the system described herein.

FIG. 1 is a schematic cross-sectional illustration of a system 100 including hollow rebar 110 providing a CSL access tube and reinforcing a drilled shaft 102 according to an embodiment of the system described herein. The CSL hollow rebar 110 may be attached in a foundation or grade beam 104 via an embedment plate 106 and a plate attachment assembly 108, such as top and bottom nuts and bolts. The CSL hollow rebar 110 is disposed inside of a rebar cage 120, including longitudinal rebar 122 for structural reinforcement and reinforcing hoop steel 124. According to the system described herein, the CSL hollow rebar 110 is used both for structural reinforcing rebar of the drilled shaft 102 and to provide an access tube for a CSL probe and/or other appropriate ultrasonic testing procedure probe. It is noted that, in an embodiment, all access tubes provided for the CSL, and/or other sonic integrity testing, may be the hollow rebar 110 that is further providing structural reinforcement of the drilled shaft 102.

FIGS. 2A and 2B are schematic illustrations showing sectional views taken from sections A and B, respectively, of FIG. 1. In FIG. 2A, four CSL hollow rebar access tubes 110 are shown disposed evenly around the rebar cage 120 with respect to the longitudinal rebar 122 (three each disposed evenly between the CSL hollow rebar 110) and surrounded by the reinforcing hoop steel 124. FIG. 2B shows a view of the attachment of the hollow rebar 110 to the embedment plate 106 in the foundation or grade beam 104.

The following description provides a specific implementation of an embodiment for the system described herein using T73/56 hollow threaded rebar. A T73/56 hollow threaded rebar/access tube has 2.11 sq. in. of area, approximately equal to use of two #9 rebar (A=1.00 sq. in. each). In an embodiment, three each of T73/56 hollow threaded rebar may be used to replace some of the other rebar that would normally be required while also providing sonic access tubes. For

TABLE 1

| CSL/Hollow Threaded Rebar Properties | | | | | | | |
|---|---|---|---|---|---|---|---|
| | | Load Capacity | | | Outside Diameter | | |
| Rod size D Ø/Inner Ø mm | Area in² mm² | Ultimate G.U.T.S. kips kN | Yield kips kN | Max. Test kips kN | Effective d Ø in mm | Nominal D Ø in mm | Weight lbs/lf kg/m |
| 73/56 R.H. Thread | 2.11 1360 | 232.7 1035 | 186.6 830 | 185.5 825 | 2.76 70 | 2.87 73 | 7.3 10.8 |

T73/56 hollow rebar may provide continuous access tube segments that can be coupled to any required length, and the couplings may be watertight with rubber seals to prevent leakage. The T73/56 hollow rebar is structural high grade steel that may replace or augment the longitudinal reinforcing steel required for axial load design, as further discussed in detail elsewhere herein. Deformations on T73/56 and material stiffness may provide desirable resistance to debonding and produce consistent CSL results. Although use of T73/56 rebar is principally discussed herein, it is noted that in other embodiments, other types of hollow rebar may be used according to desired construction techniques and according to desired diameters of the access tube in connection with example, for a 3'-0" drilled shaft, total reinforcing requirements under applicable codes are 14 sq. in. steel area. By using three T73/56 rebars, three access tubes are provided in addition to providing a steel rebar area of 6.33 sq. in., thereby reducing the required steel area for other longitudinal rebar to 14−6.33=7.67 sq. in. The steel area requirement may then be met, for example, by further using eight each of #9 rebar (A=1.00 sq. in. each) which equals an area of 8.00 sq. in. (which is acceptably greater than 7.67 sq. in.). Without the use of the three T73/56 hollow threaded rebars, fourteen #9 rebars would be required for the required steel rebar total area (14 sq. in.). Table 2, below, shows statistics for the use of CSL/Hollow threaded rebar compared to known longitudinal reinforcing techniques with use of additional non-structural CSL access tubes.

TABLE 2

CSL/Hollow Threaded Rebar vs. Known Longitudinal Reinforcing

|  | CSL Hollow Threaded Rebar | | Known Longitudinal Reinforcing | |
| --- | --- | --- | --- | --- |
|  | Pieces to assemble | steel area [in$^2$] | Pieces to assemble | steel area [in$^2$] |
| Number of #9 rebar | 8 | 8.00 | 14 | 14.00 |
| Number of additional non-structural CSL access tubes | — | — | 3 | — |
| Number of CSL hollow threaded rebar | 3 | 6.33 | — | — |
| Total | 11 | 14.33 | 17 | 14.00 |

In a possible configuration, the #9 bars may be disposed between the three equally spaced T73/56 hollow rebar/access tubes around the circumference of the rebar cage. In this configuration, there is a total of 11 pieces to assemble (three T73/56 hollow rebar+eight #9 rebar) which is easier to install, less costly and more efficient than using, for example, fourteen #9 rebar plus three additional non-structural smooth PVC/steel access tubes (see Table 2). It is noted that the T73/56 hollow rebar may be subsequently filled with cement grout to produce a composite structural section. In the illustrated example, approximately 45% of the total steel area to be provided for longitudinal structural reinforcing by rebar is made up of the hollow rebar that also provides access tubes for the CSL. This percentage portion of the required steel area provided by hollow rebar may be varied according to specific design considerations and requirements. In an embodiment, a desirable range for the percentage portion may be between 30% and 60%, for example. In other embodiments, this range may be adjusted depending on the number of sonic access tubes desired and/or other considerations. For example, in an embodiment, one access tube may be provided per foot of diameter of the rebar cage of the drilled shaft.

FIG. 3 is a schematic illustration showing insertion of a CSL probe 210 into a hollow threaded rebar 200 that is functioning as an access tube used in connection with CSL according to an embodiment of the system described herein. Accordingly, T73/56 rebar may be used for drilled shaft sonic access tubes and longitudinal reinforcing and thereby serves two purposes while reducing labor and material cost for CSL access, as discussed in detail elsewhere herein. The system described herein provides an opportunity for value engineering of conventional drilled shaft construction and design methods and permitting larger windows in reinforcing for concrete to pass through and providing a larger encompassed area to be tested. Debonding of sonic tubes is reduced or eliminated as hollow threaded bars perform as rigid reinforcing. Further, it is noted that the hollow bar (e.g., having a nominal 3" outer diameter) may be much stiffer than normal rebar thereby facilitating rebar cage handling.

Figure 4:
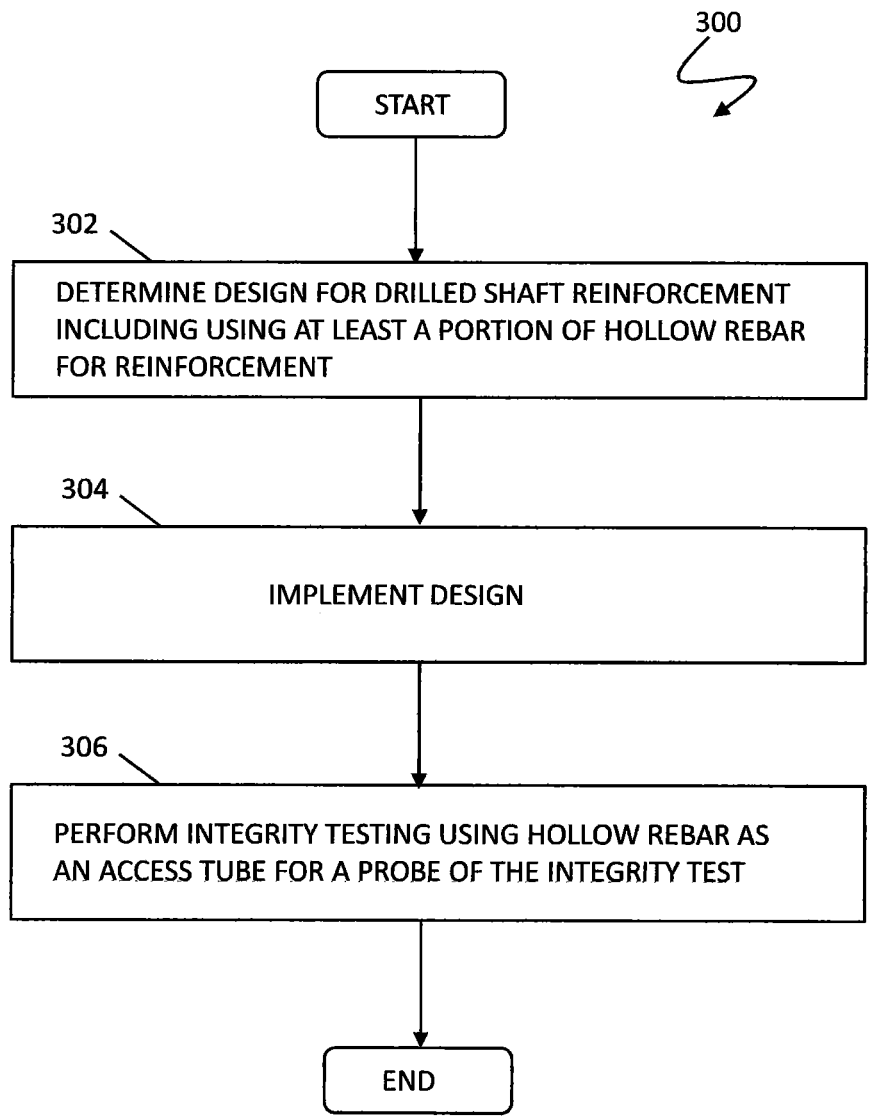
FIG. 4 is a flow diagram showing processing steps in connection installing and using hollow rebar for drilled shaft reinforcement and as access tubes for drilled shaft integrity testing according to an embodiment of the system described herein.

FIG. 4 is a flow diagram 300 showing processing steps in connection installing and using hollow rebar for drilled shaft reinforcement and as access tubes for drilled shaft integrity testing according to an embodiment of the system described herein. At a step 302, A design for structural reinforcement of a drilled shaft is determined in which a portion of reinforcing rebar used to reinforce a drilled shaft is to be instead replaced with hollow rebar, such as T73/56 hollow threaded rebar. The determination may be made according to applicable codes and standards for structural reinforcement design of a drilled shaft having desired dimensions. After the step 302, processing proceeds to a step 304 where reinforcing of the drilled shaft is implemented according to the structural reinforcement design that includes the replacement of a portion of longitudinal rebar with the hollow threaded rebar. As discussed elsewhere herein, debonding of sonic access tubes is reduced or eliminated by using hollow threaded rebar. After the step 304, processing proceeds to a step 306 where the hollow threaded rebar implemented in the drilled shaft reinforcement design is used as an access tube in connection with insertion of a probe to verify structural integrity of the shaft and associated concrete structure according to a integrity testing procedure, such as CSL. After the step 306, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of performing integrity testing of a drilled shaft, comprising:
   forming the drilled shaft using at least one hollow rebar, wherein the at least one hollow rebar has a central longitudinal opening that accepts a probe for integrity test; and
   inserting the probe for an integrity test into the central longitudinal opening of the at least one hollow rebar of the drilled shaft that acts as at least one access tube for the integrity test, wherein the at least one hollow rebar further provides structural reinforcement of the drilled shaft according to a cross-sectional area of the at least one hollow rebar and other supports used for the drilled shaft.

2. The method according to claim 1, wherein the at least one hollow rebar includes threads or ridges that eliminate debonding of the hollow rebar from concrete of the drilled shaft.

3. The method according to claim 1, wherein the at least one hollow rebar is TITAN 73/56 hollow threaded rebar.

4. The method according to claim 1, wherein the integrity test is crosshole sonic logging.

5. The method according to claim 1, wherein the integrity test is gamma gamma logging.

6. The method according to claim 1, wherein the at least one hollow rebar is a plurality of hollow rebars equally spaced around a circumference of a rebar cage of the drilled shaft.

7. The method according to claim 1, wherein the at least one access tube includes one access tube per foot of diameter of a rebar cage of the drilled shaft.

8. The method according to claim 1, wherein all access tubes for the integrity test are provided by the at least one hollow rebar and all of the access tubes further provide structural reinforcement of the drilled shaft.

9. The method according to claim 1, wherein, for a total steel area of longitudinal reinforcing rebar provided by a rebar cage of the drilled shaft, a percentage of the total steel area provided by the at least one hollow rebar is in a range of 30% to 60%.

10. A system for reinforcing a drilled shaft, comprising:
- at least one hollow rebar having a central longitudinal opening that provides an access tube for an integrity test of the drilled shaft; and
- at least one other support provided in the drilled shaft, wherein the at least one hollow rebar and the at least one other support provide structural reinforcement to the drilled shaft according to a cross-sectional area of the at least one hollow rebar and the at least one other support.

11. The system according to claim 10, wherein the at least one hollow rebar includes threads or ridges that eliminate debonding of the hollow rebar from concrete of the drilled shaft.

12. The system according to claim 10, wherein the at least one hollow rebar is TITAN 73/56 hollow threaded rebar.

13. The system according to claim 10, wherein the integrity test is crosshole sonic logging.

14. The system according to claim 10, wherein the integrity test is gamma gamma logging.

15. The system according to claim 10, wherein the at least one hollow rebar is a plurality of hollow rebars equally spaced around a circumference of a rebar cage of the drilled shaft.

16. The system according to claim 10, wherein the at least one access tube includes one access tube per foot of diameter of a rebar cage of the drilled shaft.

17. The system according to claim 10, wherein all access tubes for the integrity test are provided by the at least one hollow rebar and all of the access tubes further provide structural reinforcement of the drilled shaft.

18. The system according to claim 10, wherein, for a total steel area of longitudinal reinforcing rebar provided by a rebar cage of the drilled shaft, a percentage of the total steel area provided by the at least one hollow rebar is in a range of 30% to 60%.

* * * * *